United States Patent
Volmering et al.

(10) Patent No.: US 12,458,927 B2
(45) Date of Patent: Nov. 4, 2025

(54) HOLLOW FIBER MEMBRANE AND METHOD FOR CLOSING THE SAME

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

( * ) Notice: Subject to any disclaimer, the term of this patent is extended or adjusted under 35 U.S.C. 154(b) by 0 days.

(21) Appl. No.: 18/652,528

(22) Filed: May 1, 2024

(65) Prior Publication Data

US 2024/0350976 A1      Oct. 24, 2024

Related U.S. Application Data

(63) Continuation of application No. PCT/EP2022/080374, filed on Oct. 31, 2022.

(30) Foreign Application Priority Data

Nov. 20, 2021   (DE) .......................... 102021128878.9

(51) Int. Cl.
    *B01D 63/02*       (2006.01)
(52) U.S. Cl.
    CPC .........  *B01D 63/023* (2013.01); *B01D 63/024* (2013.01)
(58) Field of Classification Search
    None
    See application file for complete search history.

(56) References Cited

U.S. PATENT DOCUMENTS

2009/0039012 A1   2/2009   Ryu et al.
2013/0240436 A1   9/2013   Johnson

FOREIGN PATENT DOCUMENTS

| EP | 2825296 | 1/2015 |
|----|---------|--------|
| JP | H04250828 A | 9/1992 |
| JP | H06106034 A | 4/1994 |
| JP | H1319505 A | 11/1999 |
| KR | 20150076504 A | 7/2015 |
| WO | WO2017194194 A1 | 7/2017 |

*Primary Examiner* — Krishnan S Menon
(74) *Attorney, Agent, or Firm* — Von Rohrscheidt Patents

(57) ABSTRACT

A method for closing one side of a hollow fiber membrane including a lumen and a wall radially enveloping the lumen, wherein the wall includes an inner textile layer, wherein a portion of a low viscosity resin flows at least partially through a face of the hollow fiber membrane into an end portion of the hollow fiber membrane and closes the end portion with an outer free surface and is being cured by UV light. In order to reduce a propensity for blocking between the end portions of the hollow fiber membranes it is proposed that that the portion is fed in its entirety by positive pressure through the face into the end portion and cured after a time period of 5 seconds at the most, and that the portion is arranged exclusively within the hollow fiber membrane after curing.

7 Claims, 8 Drawing Sheets

HOLLOW FIBER MEMBRANE AND METHOD FOR CLOSING THE SAME

RELATED APPLICATIONS

This application is a continuation of International Patent Application PCT/EP2022/080374 filed on Oct. 31, 2022, claiming priority from German Patent Application DE 10 2021 128 878.9 filed on Nov. 5, 2021, both of which are incorporated in their entirety by this reference.

FIELD OF THE INVENTION

The invention relates to a method for one sided closing of a hollow fiber membrane. The invention furthermore relates to a hollow fiber membrane including a lumen.

BACKGROUND OF THE INVENTION

A generic method and a generic membrane filter including generic hollow fiber membranes are known from US 2013/0240436 A1 and US 2009/0039012 A1.

The known methods include vertically dipping the free end of the hollow fiber membrane into a low viscosity light curable resin or glue, wherein a portion of a low viscosity resin partially flows through a face of the hollow fiber membrane into an end portion of the hollow fiber membrane and closes the end portion with an outer free surface and wherein the resin is cured by UV-light thereafter.

The first known method includes taking the hollow fiber out of the resin before curing so that a drop of the resin remains at the free end of the hollow fiber and the drop is cured thereafter. The drop then forms the outer free surface. According to the second known method the hollow fiber membrane is dipped into a mold including resin and remains in the mold until the resin is cured. Thereafter, the mold is removed and the closed end has an outer free surface that is shaped according to the contour of the mold.

According to both methods part of the portion fills the lumen of the end portion of the hollow fiber membrane, another portion envelops an outer surface of the membrane in an end portion of the membrane and another portion extends beyond the face of the hollow fiber membrane and closes the face of the hollow fiber membrane. This provides a reliable closure not only for the lumen, but also for the textile layer and the membrane layer applied to the textile layer, thus also of the complete hollow fiber membrane including the wall.

The resin layer of the drop on the outer surface of the hollow fiber membrane simultaneously causes a thickening of the end portion of the hollow fiber membrane. The maximum diameter of the drop according to the first known method is by 0.1 mm to 1.6 mm greater than the outer diameter of the hollow fiber membrane. Additionally the drop extends significantly beyond the end cross section of the membrane in the longitudinal direction of the membrane. This applies to the second method in a similar manner.

Using membranes of this type in single header membrane filters has the advantage that the thickening of the membrane ends causes a reduction of the flow cross section which impedes stripping hair and fibrous compounds from a bundle of hollow fiber membranes in the membrane filter, in particular when the membrane bundles are integrated in a housing, e.g. in a tube. Additionally a comparatively large portion of the resin is required for closure due to the external thickening and due to the material application behind the face of the hollow fiber membrane.

JP-H 11 319505 describes a method for simultaneous closure of plural hollow fiber membranes whose wall is not reinforced with an inner textile layer. The ends of the hollow fiber membranes are initially positioned in rows offset from one another, e.g. fixed by an adhesive tape. Subsequently the free fiber ends of the hollow fiber membranes are vertically dipped into a low viscosity resin in the longitudinal direction of the membranes. Thus, the resin rises exclusively through a capillary effect in the lumen of the hollow fiber membranes, and the resin rises significantly above the surface of the resin reservoir into which the membrane ends are dipped.

After pulling the hollow fiber membranes out of the resin reservoir the resin is cured by UV-light radiation. Prior offsetting the hollow fiber membranes prevents that the resin rises through capillary ascension also on the outside between the membranes to a similar level as through the capillary effect in the lumen of the membranes. This means the resin level in the lumen of the hollow fiber membranes rises significantly higher than outside of the hollow fiber membranes. The dipped end of the hollow fiber membranes includes a resin layer on an outside on the membrane surface. This generates a risk of individual membranes being glued together with their ends. In order to reliably prevent the possibility of the membranes being glued together and being externally thickened by resin cured on the membrane surface the ends of the membranes are cut off after curing the resin so that a portion of the resin still remains in the lumen of the membranes while the outside of the hollow fiber membranes is free from resin. This portion of the resin that remains in the cut off finished fiber was introduced into the end portion through the face of the hollow fiber membranes purely by capillary effect. The portion of the resin has a smooth cut surface towards the face of the membrane after cutting the ends off.

A prerequisite for using this method is a sufficiently strong capillary effect in the lumen of the hollow fiber membrane so that the capillary effect causes the resin in the lumen to rise significantly above the resin level on the outside during dipping. Capillary effects that strong typically only occur with hollow fiber membranes without textile layer and with a very small lumen diameter. A known method specifies lumen diameters of approximately 0.35 mm. An increasing lumen diameter reduces the capillary effect and the resin may not rise sufficiently high anymore in the lumen in order to be able to use the method.

CN 110960988 A proposes for hollow fiber membranes without textile layer to dilute an epoxy or polyurethane resin with a solvent and to introduce the mix under pressure into a membrane bundle so that resin particles penetrate the pores of the fiber layer, then to dry the solvent through a gas flow and to cure the resin at ambient temperature over several hours or to cure the resin by microwaves at least for several minutes. Over these long time periods a low viscosity resin would be completely absorbed from the lumen of the membrane by a capillary effect of an inner textile layer which would re-open the lumen.

WO 2012 147 932 A1 describes a method for repairing a hollow fiber membrane in a membrane filter where the membranes are attached in a header at a top and at a bottom. The defective portion of the membrane is thus cut out which creates two free ends of the cut off hollow fiber membranes that have to be closed. In this case the closing is performed manually using a hot melt glue gun. The end of the hollow fiber membrane is thus inserted into the tip of the hot glue gun with a small portion of the length of the hollow fiber membrane. In order to be able to perform this insertion in a simple manner, the tip of the hot melt glue gun is larger than the outer diameter of the membrane. Thereafter, a portion of the hot melt glue is pressed out of the hot melt glue gun, wherein only a small amount of the portion reaches the lumen of the hollow fiber membrane through the face of the hollow fiber membrane. Subsequently the hot melt glue gun is pulled off from the membrane end again so that the portion solidifies through cooling and closes the fiber end. Thus, the cured portion has a maximum diameter that is significantly greater than the outer diameter of the hollow fiber membrane and the cured portion protrudes significantly beyond the face of the hollow fiber membrane. Both features are important for the method in order to assure reliable closure of the free end since the hot melt glue has very high viscosity also in hot conditions and therefore does not penetrate into the wall of the membrane to close the membrane. Thus, a closure of the fiber ends can only be achieved when the hot melt glue forms an outer layer outside of the outer diameter of the hollow fiber membrane and protrudes beyond the face of the hollow fiber membrane in the longitudinal direction of the hollow fiber membrane in addition to forming a plug in the lumen of the membrane. The above cited reference specifies the membrane end to be thickened by a factor of 1.2 compared to the outer diameter of the hollow fiber membrane and specifies a value of 0.1 times to 0.5 times the outer diameter of the length of the resin layer behind the end cross section in the longitudinal direction of the hollow fiber membrane.

BRIEF SUMMARY OF THE INVENTION

Thus, it is an object of the invention to reduce a blocking propensity between the end portions of the hollow fiber membranes.

Improving upon the known method the object is achieved by a method for closing one side of a hollow fiber membrane, the hollow fiber membrane including a lumen and a wall radially enveloping the lumen, the wall including an inner textile layer, the method comprising: flowing a portion of a low viscosity resin at least partially through a face of the hollow fiber membrane into an end portion of the hollow fiber membrane and closing the end portion with an outer free surface of the portion and curing the portion by UV light; and feeding the portion in its entirety by positive pressure through the face into the end portion and curing the portion after a time period of 5 seconds at the most, wherein the portion is arranged exclusively within the hollow fiber membrane after the curing.

This has the advantage that the outer portion of the hollow fiber membrane is not thickened by resin at all and no resin accumulation is arranged behind the face of the hollow fiber membrane, wherein the resin accumulation is configured e.g. as a resin drop. Thus, an amount of resin that is required for closing the hollow fiber membrane is very small so that the method according to the invention only requires a small amount of resin material which is economical. Feeding the resin into the hollow fiber membrane under positive pressure and a short welling time before curing renders the time required for closing the hollow fiber membrane controllable, and thus very short which facilitates automating and economizing the process.

Improving upon the known hollow fiber membrane the object is also achieved by a hollow fiber membrane, comprising: a lumen; and a wall, wherein the wall includes an inner textile layer radially enveloping the lumen, wherein an end portion of the hollow fiber membrane is closed by a portion of a resin that is cured by UV-light and that has low viscosity before curing, wherein the portion is arranged in its entirety within the hollow fiber membrane.

Thus, the membrane does not have any resin thickness increase at its closed end where hair and fibrous compounds could overwise adhere to the thickness increase caused by the resin. Thus, the membrane according to the invention has a reduced blocking propensity.

In the membrane known from JP-H11 319 505, an entirety of the portion is arranged within the hollow fiber membrane after curing. This membrane, however, does not include a wall with an inner textile layer. The method described in JP-H11 319505 only works for hollow fiber membranes that have a strong capillary effect in the lumen. Due to the capillary effect, the resin in the lumen has a propensity to rise higher than on the outside of the membrane so that the end of the membrane thickened by the resin can be cut off after curing. Only then the portion of the resin remaining in the membrane end is arranged within the hollow fiber membrane in its entirety. This method does not work for hollow fiber membranes with a wall including an inner textile layer since hollow fiber membranes of this type do not have a sufficient capillary effect in the lumen. This is caused by a very strong suction effect of the textile layer for the low viscosity resin, which almost shuts down an entirety of the capillary effect in the lumen. When dipping the free membrane end of a textile reinforced hollow fiber membrane into a low viscosity resin, the resin entering the lumen is pulled into the textile layer immediately. Therefore, a resin level in the lumen does not rise but remains even below a resin surface into which the hollow fiber membrane was dipped. This is also proven, by the known membrane from EP 28 25 296. It is evident from FIGS. 2 to 2A and 3B1 of this document that the resin level in the lumen cures even below the resin surface into which the membrane end was dipped. This means the capillary effect of the lumen is almost non-existent. Therefore, the method according to JP-H11 319505 does not work with the textile reinforced membranes.

It is an advantage of the method according to the invention, that the portion of the resin is within the hollow fiber membrane in its entirety without having to cut off the membrane ends as required by the method according to JP-H11 319505. This removes a method step and the material yield during production is higher, this means more yield from the membrane material in the finished product. Therefore, the method according to the invention is more cost effective and simpler.

In the membranes according to the invention typically a polymer layer is externally applied to the textile layer wherein the polymer layer determines the release properties of the membrane. Thus, the membranes are typically from the field of micro filtration or ultra filtration but they can also come from the field of nano filtration or low-pressure reverse osmosis membranes. The textile layer provides increased mechanical strength to the membranes which has advantages for the operation of membrane bioreactors (MBR) for waste water treatment. Thus, typically micro or ultrafiltration membranes are being used that have pore sizes in a range of 0.02 to 0.4 µm. The outer diameter of the typically used hollow fiber membranes that are fixed on one side is in a range of 1.5 mm to 3.0 mm with lumen diameters of 0.7 to 1.8 mm.

The textile layer of the hollow fiber membrane according to the invention provides high strength to the membrane which is an advantage for the rough operating conditions that are used in membrane bioreactors (MBR) for waste water treatment. Thus, it is within the spirit and scope of the invention that the inner textile layer is e.g. a woven, knitted, or braided tube, a purled tube or a fleece or felt tube. The inner textile layer can also be from any other textile material that is suitable for reinforcing the hollow fiber membrane, e.g. a twisted yarn, twine, or rope. It is a particular challenge when closing this type of hollow fiber membrane on one side wherein the hollow fiber membranes include a textile layer in the wall, so that not only the lumen of the membrane but also its wall, and in particular the textile layer in the wall is being closed. In alternative closing methods, the closure of the textile reinforced wall is always achieved in that the cured resin includes a coherent portion on an outside on the surface of the hollow fiber membrane behind the face of the hollow fiber membrane which completely embeds an end portion of the wall of the hollow fiber membrane, thus closing the wall of the hollow fiber membrane by the embedding.

According to the method according to the invention where the closed membranes do not have a continuous portion on an outside of the membrane and behind the face, the resin has to wet the wall in the end portion including the textile layer. In order to achieve this, the resin has to have low viscosity before curing since highly viscous media do not penetrate well into the textile layer, c.f., also the method according to WO 2012 147 932 A1.

It is within the spirit and scope of the invention that the outer free surface of the portion of the cured resin is configured concave in the lumen. This is achieved when the resin has very low viscosity, since the resin then drains from the lumen into the textile layer so that it is also pulled away from the face of the hollow fiber membrane. The inward oriented concave configuration of the free surface has the advantage that all resin portions at the outer end of the membrane are pulled inward before curing of the resin, and that the membrane end is very clean for this reason and does not have any unevenness from cured resin left overs. This is perfect for stripping hair and fibrous compounds during filtration operations of the hollow fiber membranes.

A viscosity in a range of 200-900 mPas (cP) is advantageous in order to achieve good and quick saturation of the textile layer.

It is within the spirit and scope of the invention that the method can also be performed with other UV curable glues or other media with similar viscosity which are all designated as resin according to the invention.

It is within the spirit and scope of the method according to the invention that the low viscosity resin has sufficient time to seep into the textile layer and saturate the textile layer. On the other hand side, this time period must not be excessively long since there is a risk otherwise that the resin seeps into the textile layer far enough so that the lumen opens again and is not closed by the resin anymore. It is a challenge to let the resin seep into the textile layer long enough to saturate the textile layer and then quickly cure the resin with UV light while the lumen is still closed by the resin. Therefore the curing has to occur in a defined time window.

Feeding the portion of the resin is time critical if the feeding is done too slowly the entire resin drains directly into the textile layer, wherein the lumen of the hollow fiber membrane is not filled with resin, this means there is no functional closure of the free end. Therefore, the infeed has to be performed quickly enough in order to initially fill the lumen with resin. In order to achieve this the infeed is performed with positive pressure.

The positive pressure for feeding the resin can be generated by a pump or in that the resin is put into a storage container that is placed under positive pressure. The resin can also be fed into the end portion of the membrane by an injection needle or a piston. Thus, the portion of the resin can be separated in advance for example by using a syringe or a pump with a defined pump volume or the portion of the resin can be continuously fed from a reservoir e.g. by a pump.

Therefore the time sequence of the closing process is of crucial importance for achieving a functional closure of the membrane ends. It is therefore advantageous for the method according to the invention that the feeding is performed within 0.5 to 2.5 seconds and that the lumen in the end portion is initially filled with the resin and that a dwelling time of at least one second is provided between the end of the feeding and the beginning of the UV-radiation wherein the resin seeps from the lumen into the wall to a membrane surface of the end portion during the dwelling time and thus saturates the wall during the dwelling time while the lumen remains closed by the resin.

It is within the spirit and scope of the invention that a longitudinal axis of the hollow fiber membrane is in a horizontal position during the closure. This has advantages for the automation process since a risk of a gravity induced run out of the resin from the lumen is reduced. Therefore processes run cleaner and can be automated in a simpler manner.

Thus, it is advantageous for a possible automation of the method that the hollow fiber membrane is retained by a gripper in front of the end portion while sequentially performing the following in an automated manner:

sliding a funnel leading into a tubular section over the end portion until the tubular section tightly envelops the membrane surface, feeding the portion from a free end of the tubular section through the face into the end portion, sliding the funnel out of the end portion again, and positioning a UV curing unit over the end portion, wherein the UV curing unit irradiates the end portion with the UV light and thus cures the portion.

Thus, it is advantageous for the recited process steps to run within the previously recited time windows in order to achieve an optimum closure result. Thus, the dwelling time includes the time for sliding out the funnel plus the time for positioning the UV curing unit over the end portion of the hollow fiber membrane until the curing process caused by the UV light begins.

Thus, it is within the spirit and scope of the invention that the hollow fiber membranes that are to be closed are directly retrieved from a membrane production plant in an automated process and gripped by grippers. Thus, the gripper grip the membranes from an end portion of the membranes, thus the free and not-yet closed membrane ends protrude beyond the gripper. Thus, the membrane ends may be bent in one or another direction.

Thus, the funnel has the task to capture the free end of the hollow fiber membrane behind the closed gripper and to center it with respect to an axis of the funnel or the tube section in order to thread the membrane into the funnel when the funnel is slid on. A funnel angle of 45 degrees is advantageous. When the membrane is threaded into the funnel the membrane is in the axially defined position of the funnel. Resin is fed by positive pressure through the face of the hollow fiber membrane into an end portion of the hollow fiber membrane from the free end of the tube section using a resin feed arrangement.

After the feeding a residual of the liquid resin can initially protrude with a convex curvature behind the face from the lumen. During the dwelling time, the resin is pulled from this curvature into the fiber due to the suction effect of the textile layer. This pulling causes the cured resin plug in the lumen of the hollow fiber membrane to have a concave inner free surface towards the lumen as well as a concave outer free surface towards the face. After the resin is cured the grippers release the membrane before the next membrane is gripped and closed.

Thus, it is within the spirit and scope of the method according to the invention that the tube section has an inner diameter that is between 0.05 mm and 0.2 mm greater than the outer diameter of the hollow fiber membrane. This assures that the inner diameter is large enough so that the hollow fiber membrane can reliably slide into the funnel when the funnel is slid on. On the other hand side the inner diameter is small enough so that no resin can enter into the gap between the membrane surface and the inner wall of the tube section.

In the technical process it may not be preventable that a small part of the resin penetrates the gap at individual spots depending on an oval shape and properties of the membrane surface. In order to keep the amount of resin that penetrates the gap small in these cases it is advantageous to keep the portion of the tube section that closely envelops the membrane surface as long as possible. Thus, a length of at least 7 mm is advantageous.

Since the liquid resin is only fed through the face of the hollow fiber membrane into the end portion according to the method according to the invention, the portion of the resin is not easily accessible for the UV light from the outside. In order to achieve effective and quick curing light power of the UV curing unit reaching the membrane surface has to be comparatively high. This light power should be in a range between 5 and 40 W/cm$^2$ for typical hollow fiber membranes with a textile layer.

The curing time for curing the portion of the resin by UV light should be between 0.5 and 2.5 seconds. For lower light power this means too slow curing, there is a risk that the resin seeps even further out of the lumen into the wall so that the lumen opens again. When the light power is excessive damages to the membrane can occur or damages to the UV radiator by materials evaporating out of the membrane material uncontrolled like e.g. glycerin.

It is furthermore advantageous when the funnel is temperature controlled during the method according to the invention in order to maintain the temperature and thus the viscosity of the resin in a predetermined range during closing. Thus, constant flow properties of the resin are assured as a condition for defined times of the individual method steps during the closing process. This in turn is advantageous for controlling the process through process automation.

The invention also relates to a membrane filter for filtering a liquid through hollow fiber membranes respectively including a lumen and a wall including an inner textile layer that envelops the lumen, wherein the hollow fiber membranes are fixed in a base element at a bottom and respectively include an individually closed end that floats in the liquid freely, wherein the base element includes a permeate collection cavity where the lumens of the hollow fiber membrane are connected in order to collect the filtrate out of the lumen. According to the invention the ends of the hollow fiber membranes in the membrane filter are closed according to a method according to the invention.

A membrane filter of this type is typically designated as a single header membrane filter. This membrane filter according to the invention is suitable for submerged operation in membrane bioreactors (MBR) for waste water treatment. Thus, it is advantageous that hair and fibrous compounds are stripped upward freely from the (MBR) sludge during operation of the membrane filter and do not lodge in the membrane filter.

The invention also relates to a hollow fiber membrane including a lumen and a wall including an inner textile layer radially enveloping the lumen, wherein an end portion of the hollow fiber membrane is closed by a UV hardened portion of a resin that has low viscosity before curing and that has an outer free surface and wherein an entirety of the portion is within the hollow fiber membrane.

Thus, it is advantageous when the free outer surface of the portion in the lumen, is configured concave, then the membrane ends are very smooth and clean since they do not have any unevenness caused by outward oriented resin portions at an outer end of the membrane.

Furthermore the invention relates to a membrane for filtering a liquid through hollow fiber membranes that are fixed with bottom sides in a base element and respectively include an individually closed end on top that freely floats in the liquid wherein the base element includes a permeate collection cavity where lumen of the hollow fiber membranes are connected and that is configured to collect a filtrate from the lumen, characterized in that the hollow fiber membranes are configured according to one of the latter two paragraphs.

It is furthermore advantageous when the hollow fiber membranes of the base element are enveloped by a tube in a membrane filter according to the invention. Thus, air introduced for flushing the membranes during operation of the membrane filter in membrane bioreactors is retained in the membrane bundle and used effectively. In particular when using a tube of this type it is advantageous when the membranes do not have any resin thickness increases in the end cross section. These thickness increases would cause a detrimental reduction of the flow cross section which would impede a flow of the liquid to be filtered and the stripping of hair and fibrous compounds from the hollow fiber membranes.

BRIEF DESCRIPTION OF THE DRAWINGS

The invention is subsequently described based on embodiments with reference to drawing figures, wherein.

DETAILED DESCRIPTION OF THE INVENTION

Figure 1A:
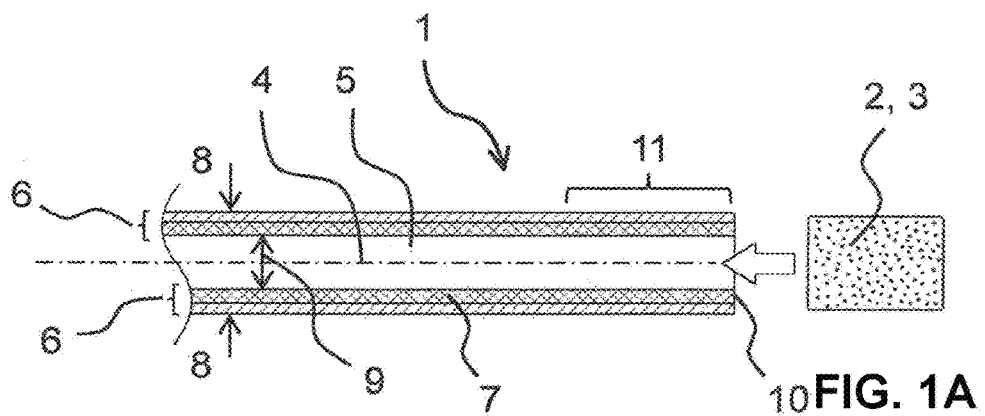
FIGS. 1A-1F show the process steps of the first method according to the invention in a sectional view.
Figure 1B:
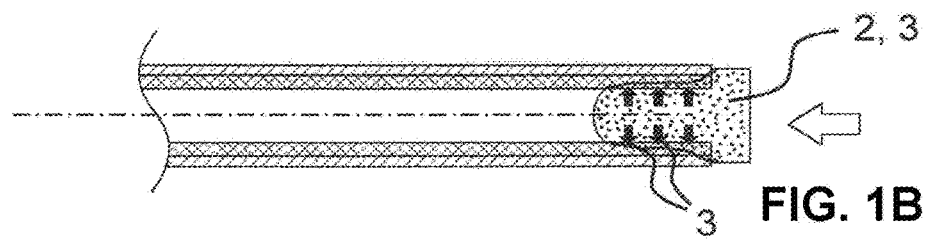

The drawing figures are not drawn to scale. All non-described details of the subsequently described methods, hollow fiber membranes or membrane filters according to the invention are identical to prior described methods, hollow fiber membranes or membrane filters.

FIGS. 1A-1F show process steps of a first method according to the invention in a sectional view for one sided closure of a braided material reinforced hollow fiber membrane 1 including a portion 2 of a low viscosity resin that is curable by UV light (FIG. 1A). The portion has a volume of 50 μl. The resin 3 has a viscosity of 300 mPas (cP).

The hollow fiber membrane 1 includes a longitudinal axis 4 that is in a horizontal position during closure. The hollow fiber membrane 1 furthermore has a lumen 5 and a wall 6 that radially envelops the lumen 5. The wall 6 includes an inner textile layer 7 that reinforces the hollow fiber membrane 1 that has an outer diameter 8 of 2.6 mm and a lumen diameter 9 of 1.4 mm.

Figure 1C:
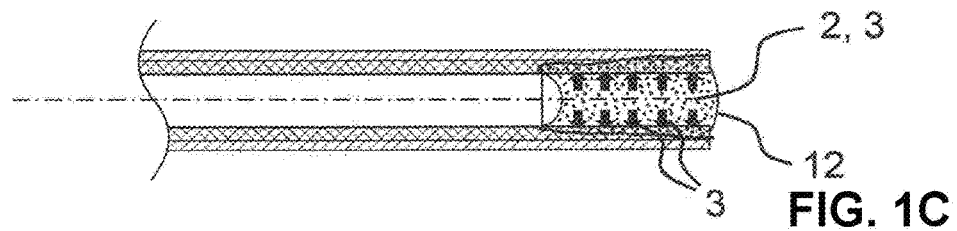

The portion 2 is fed in its entirety by positive pressure through a face 10 of the hollow fiber membrane 1 into an end portion 11 of the hollow fiber membrane 1. Thus, the resin 3 initially fills the lumen 5. The resin 3 starts seeping into the wall 6 and the textile layer 7 (FIG. 1B) right from the beginning of feeding the portion 2. At the end of the feeding process, the portion 2 is arranged within the hollow fiber membrane 1 and initially includes a convex wall 12 of the still liquid resin 2 at an outside behind the face 10 (FIG. 1C). The feeding time is one second.

Figure 1D:
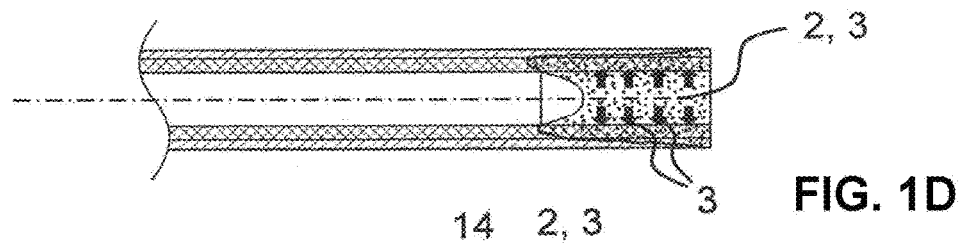

During a dwelling time which starts after feeding the resin 3 into the end portion 11, the resin 3 seeps out of the lumen 5 into the wall 6 and saturates the wall including the textile layer 7. During the dwelling time, the resin 3 retreats from the convex curvature 12 into the lumen 5 of the hollow fiber membrane 1 (FIG. 1D)

Figure 1E:
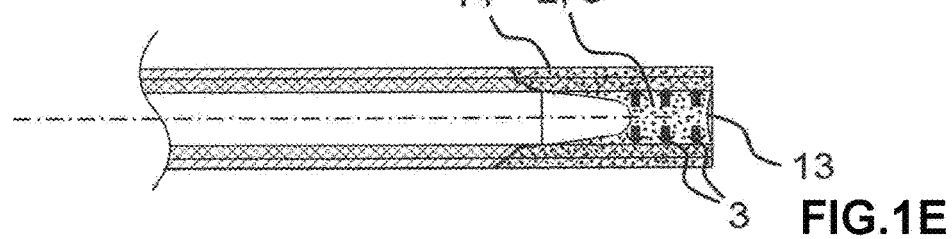
Figure 1F:
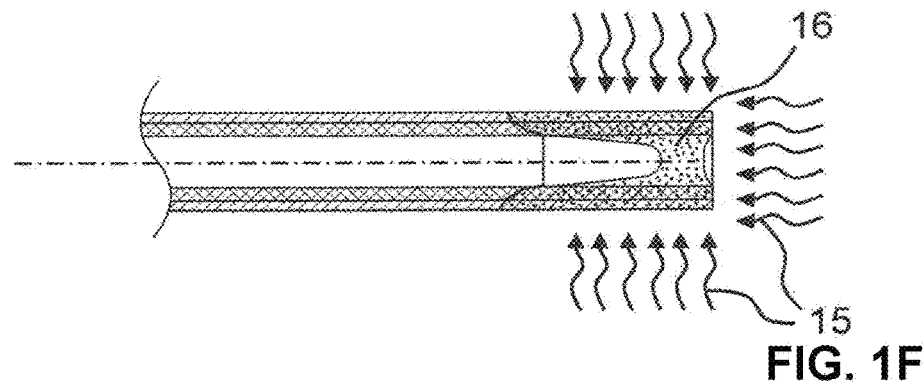

During the rest of the dwelling time, an outer free surface 13 of the portion 2 in the lumen 5 develops a concave shape in that the resin 3 retreats further into the lumen 5 and seeps from the lumen 5 into the wall 6 (FIG. 1e). Simultaneously the resin seeps through the wall to an outer membrane surface 14 of the hollow fiber membrane 1.

A final irradiation with UV light 15 terminates the dwelling time and the resin 3 is cured by the UV light 15. Thus, the current distribution of the portion 2 is fixed in the end portion 11. The dwelling time has a total duration of 2 seconds and the curing takes another 1.4 seconds.

After the curing, the portion 2 of the resin 3 is only arranged within the hollow fiber membrane 1 and a resin plug 16 formed in the lumen 5 has a concave outer free surface 13. The portion 2 thus closes the lumen 5 and the wall 6 of the hollow fiber membrane 1 including the textile layer 7 without the membrane surface 14 of the hollow fiber membrane 1 externally including a layer of the resin 3 that thickens the hollow fiber membrane 1 in the end portion 11 without cured resin 3 being arranged on the outside behind the face 10 of the hollow fiber membrane 1.

FIGS. 2A-2G show additional details for performing the first method according to the invention in a sectional view.

Figure 2A:
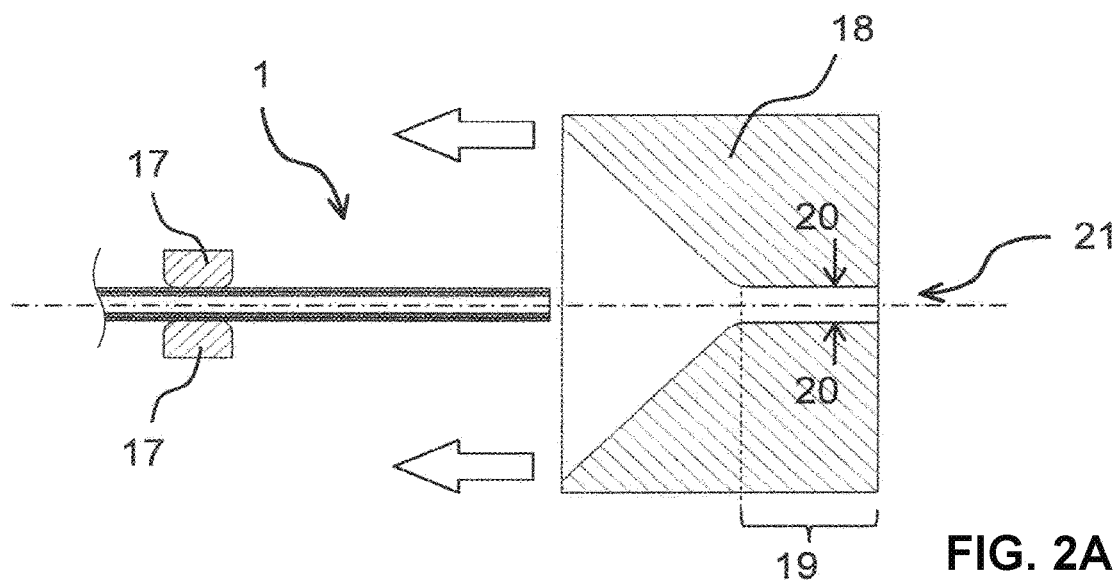
FIGS. 2A-2G show additional details for performing the first method according to the invention in a sectional view.
Figure 2B:
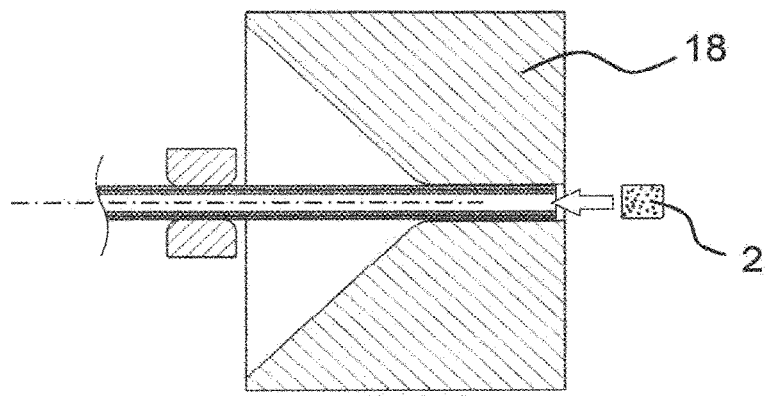
Figure 2C:
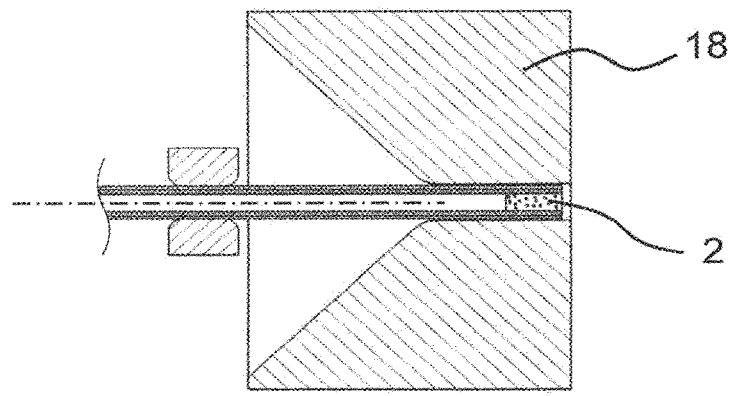
Figure 2D:
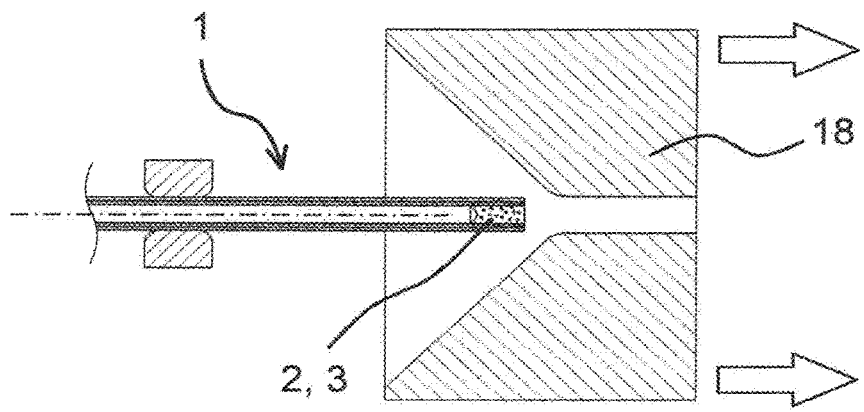
Figure 2E:
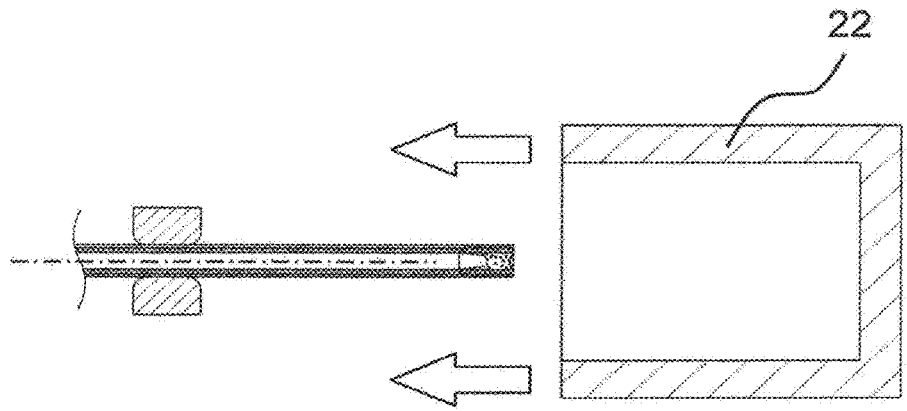
Figure 2F:
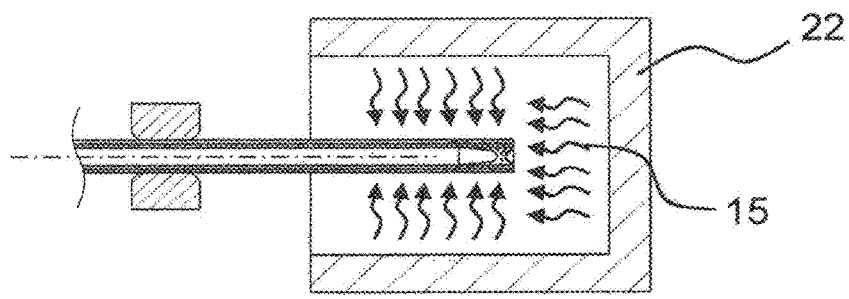
Figure 2G:
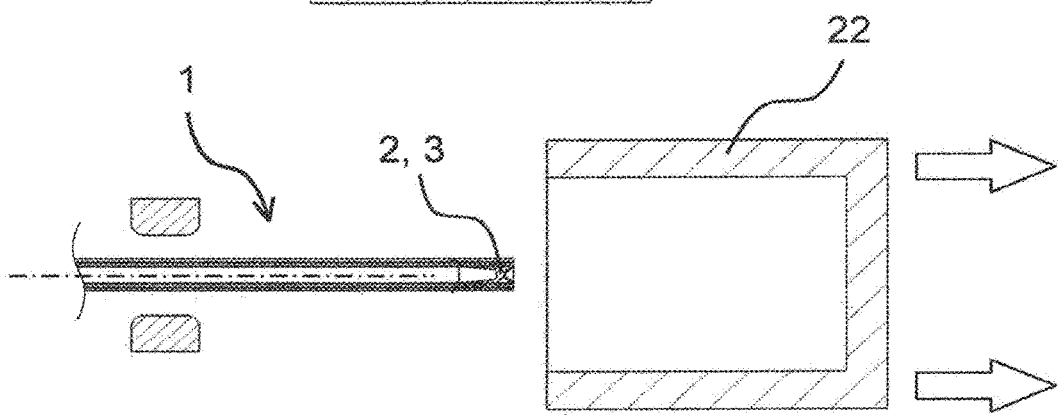

The hollow fiber membrane 1 is produced endless in a production process and retained by a gripper 17 in front of the end portion 11. The gripper 17 retains the hollow fiber membrane 1 during the entire closing process. The end portion 11 of the hollow fiber membrane 1 can bend slightly in one or another direction transversal to the longitudinal axis 4 during the gripping process. In order to capture and center the end portion 11 a funnel 18 that leads into a tube section 19 is slid over the end portion 11 until the tube section 19 tightly envelops the membrane surface 16 (FIG. 2A-2B). The portion of the tube section 19 that tightly envelops the membrane surface is approximately 8 mm.

The tube section 19 includes an inner diameter 20 which is 0.1 mm greater than the outer diameter 8 of the hollow fiber membrane 1 and thus amounts to 2.7 mm. Subsequently the portion 2, is fed from a free end 21 of the tube section 20 through the face 10 into the end portion 11. The feeding is performed by a micro dosing pump which is configured as a membrane pump with an extremely small displacement volume of 5 μl. A portion 2 of the resin 3 of 50 μl thus corresponds to a number of 10 strokes of the micro dosing pump which are performed overall during the feeding time of the resin 3 that has a duration of 1 second.

Depending on the oval shape of the hollow fiber membranes a smaller amount of the resin 3 can move into the gap between the inner diameter 20 of the tube section 19 and the outer diameter 8 of the hollow fiber membrane 1. This small portion amounts at the most to 0.1% of the portion 2 and causes a thickening of the wall 6 of less than 0.05 mm. Subsequently the dwelling time starts during which the funnel 18 is slid out of the end portion 11 again and a curing unit 22 is positioned over the end portion 11 by sliding the UV curing unit over the end portion 11 instead of the funnel 18. After positioning the UV curing unit 22, the end portion is irradiated with UV light 15 in order to cure the portion 2. The UV curing unit 22 has an installed electrical power of 100 W, wherein the entire light power of the UV radiation that impacts the membrane surface 14 is 24 W/cm$^2$. The curing time for the portion 2 of the resin 3 by UV light 15, is 1.4 seconds.

After curing the curing unit 22 is slid out of the end portion 11 again and the gripper 17 releases the hollow fiber membrane 1 again. This terminates the automated closing process of the hollow fiber membrane 1.

Figure 3A:
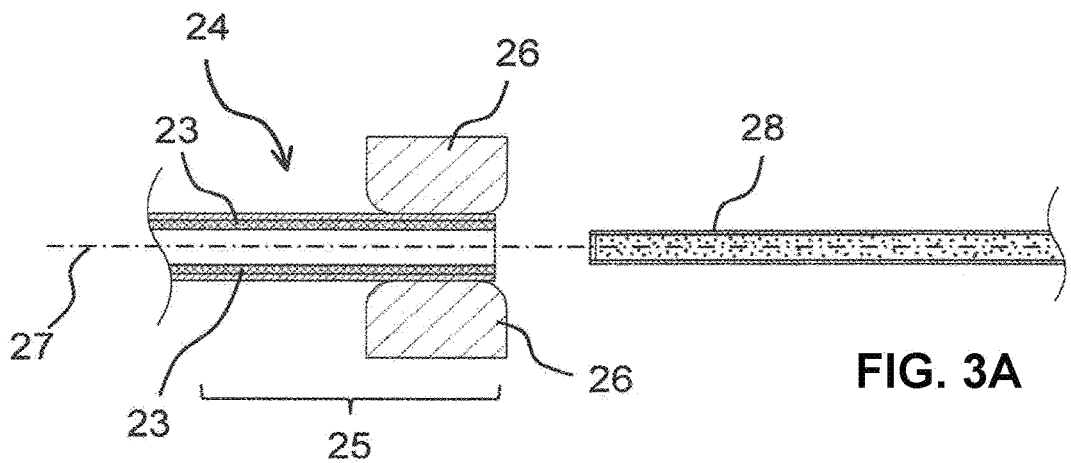
FIGS. 3A-3D show process steps of a second method according to the invention in a sectional view.

FIGS. 3A-3D show process steps of a second method according to the invention in a sectional view. Thus, a hollow fiber membrane 24 reinforced by a textile layer 23 is retained by a gripper 26 in an end portion 25 so that a longitudinal axis 27 of the hollow fiber membrane 24 is aligned with an injection needle 28 (FIG. 3A).

Figure 3B:
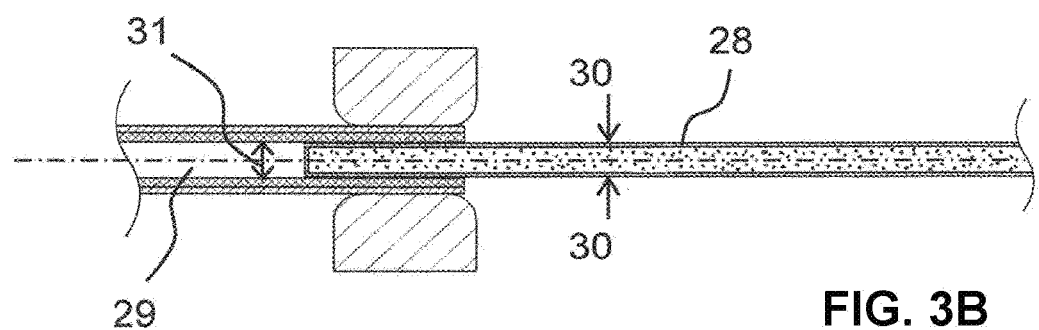
Figure 3C:
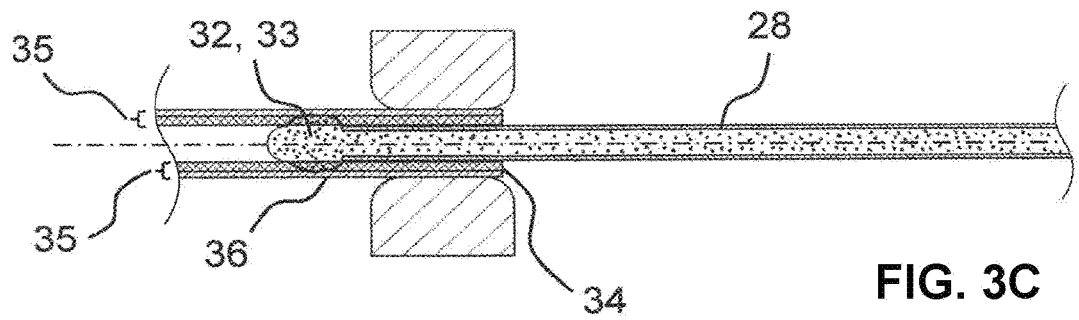
Figure 3D:
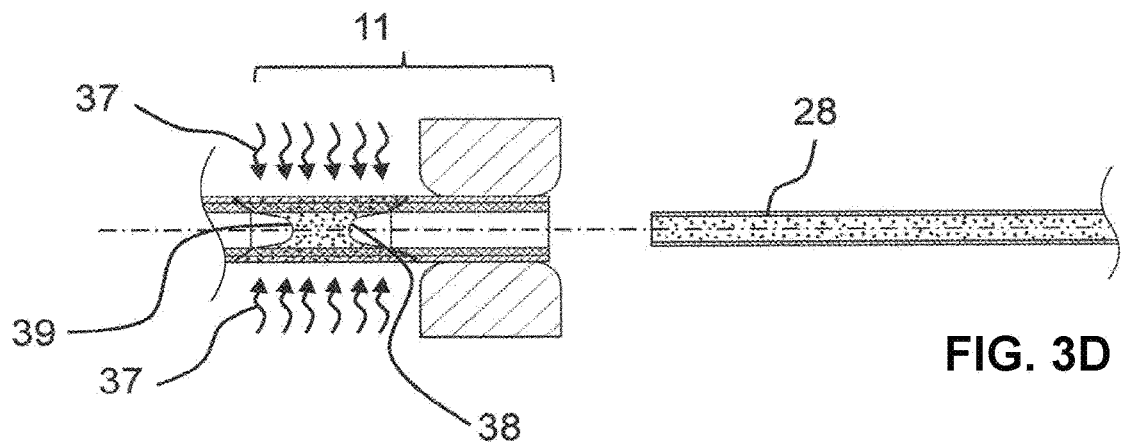

Subsequently the injection needle 28 is inserted into a lumen 29 of the hollow fiber membrane 24, wherein the injection needle 28 has an outer needle diameter 30 that is 0.1 mm smaller than the lumen diameter 31 (FIG. 3B).

Thereafter a portion 32 of the resin 33 is fed through the injection needle 28 and thus also through a face 34 of the hollow fiber membrane 24 into the lumen 29 of the hollow fiber membrane 24, wherein the portion initially spreads in the lumen closing the lumen. Thereafter the dwelling time starts during which the resin 33 seeps from the lumen 29 into a wall 35 of the hollow fiber membrane 24 and thus saturates the entire textile layer 23 and the entire wall 35.

During the dwelling time the injection needle 28 is pulled out of the lumen 29 again. The dwelling time ends when the resin 33 has seeped through the wall 35 to a membrane surface 36. Thereafter the portion is cured by UV light 37 before the gripper 26 releases the hollow fiber membrane again which completes the closure process.

The cured portion 32 of the resin 33 includes an outer free surface 38 in the lumen that is configured concave. The inner free surface 39 of the cured portion 32 oriented towards the lumen and arranged in the lumen 29, wherein the inner free surface is oriented towards the lumen 29 is also configured concave.

Figure 4A:
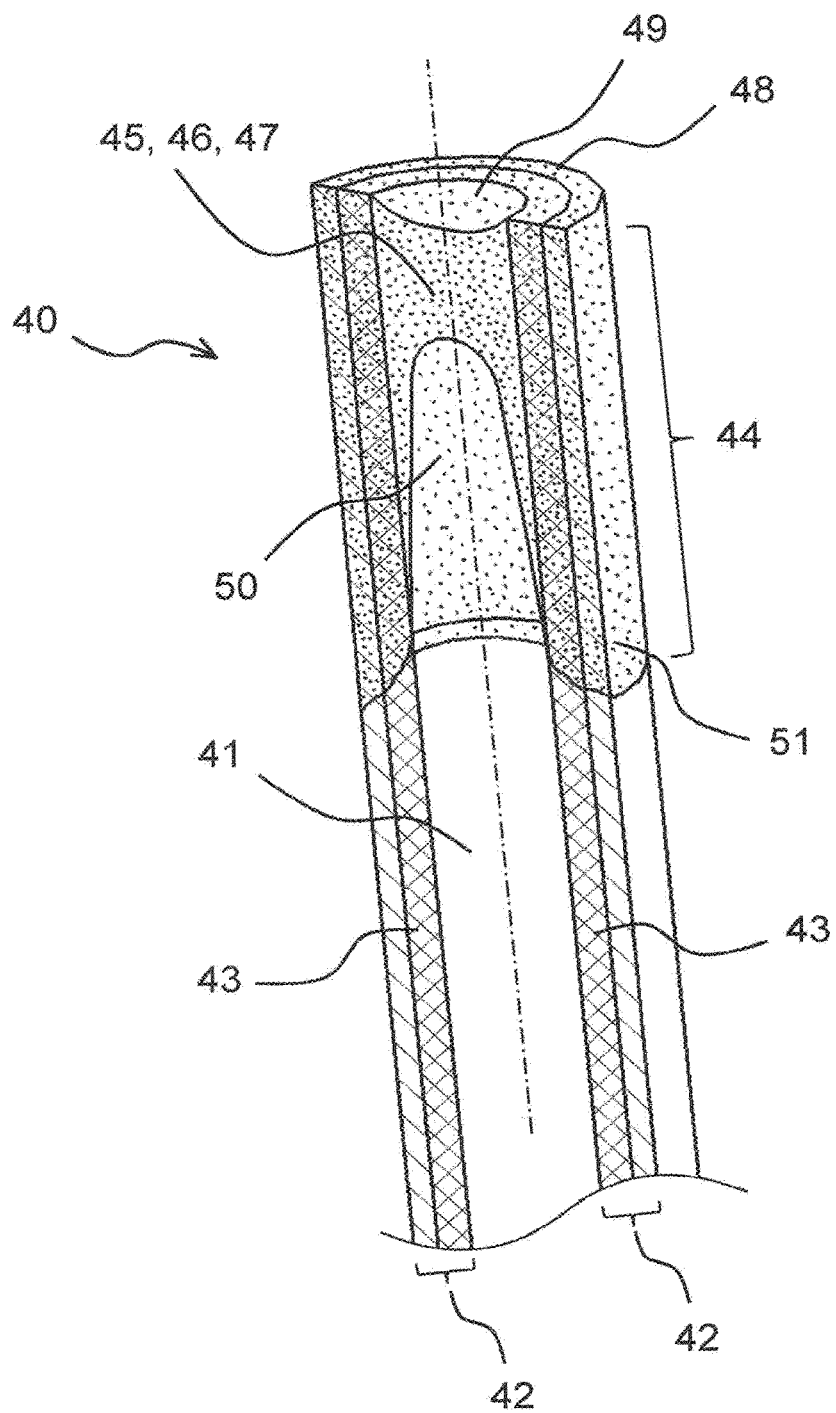
FIGS. 4A and 4B show sectional views of two different hollow fiber membranes according to the invention.

FIG. 4A shows a sectional view of a first hollow fiber membrane 40 produced according to the first method according to the invention and including a lumen 41, and a wall 42, wherein the wall 42 includes an inner textile layer 43. An end portion 44 of the hollow fiber membrane 40 is closed by a portion 45 of a resin 46 that is closed by UV light cured resin 46 that permeates and saturates the wall 42 including the textile layer 43 and forms a plug 47 in the lumen 41 that includes an outer free surface 49 oriented towards a face 48 of the hollow fiber membrane 40, wherein the outer free surface 49 is configured concave. An inner free surface 50 oriented towards the lumen 41 is also configured concave. The portion 45 is arranged exclusively within the hollow fiber membrane 40 starting at the face 47. Very small percentages of less than 0.1% of the portion 45 of the resin 46 may be cured outside on a membrane surface 51 of the hollow fiber membrane 40. These portions cause a maximum thickening of the wall 42 of less than 0.05 mm.

Figure 4B:
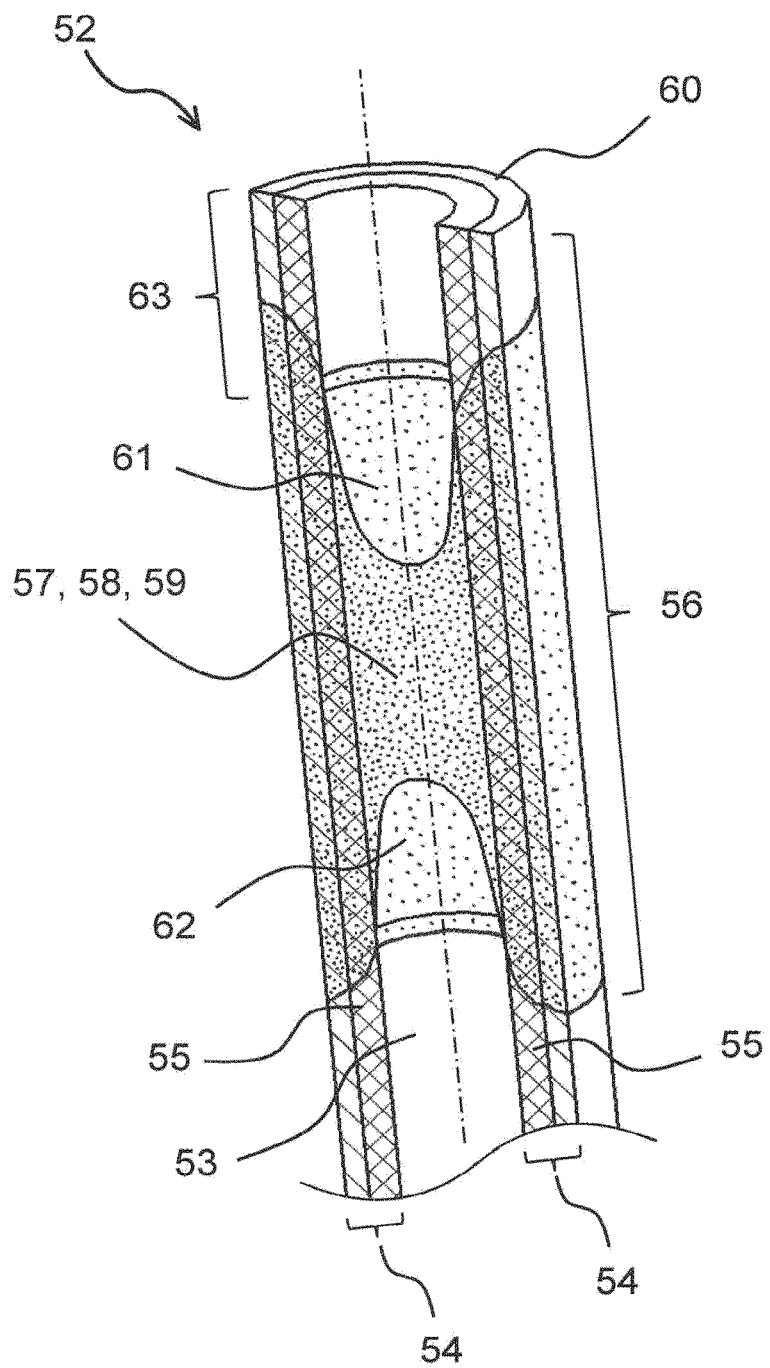

FIG. 4B shows a sectional view of a second hollow fiber membrane 52 according to the invention, that was produced according to the second method according to the invention, and that includes a lumen 53 and a wall 54, wherein the wall 54 includes an inner textile layer 55. An end portion 56 of the hollow fiber membrane 52 is closed by a portion 57 of a UV light cured resin 58 that permeates and saturates the wall 54 including the textile layer 54 and forms a resin plug 59 in the lumen 53 wherein the resin plug includes an outer free surface 61 oriented towards a face 60 of the hollow fiber membrane 52 and configured concave. An inner free surface 62 oriented towards the lumen 53 is also configured concave. The portion 58 is only arranged within the hollow fiber membrane 52 commencing at a distance 63 from the face 60.

Figure 5:
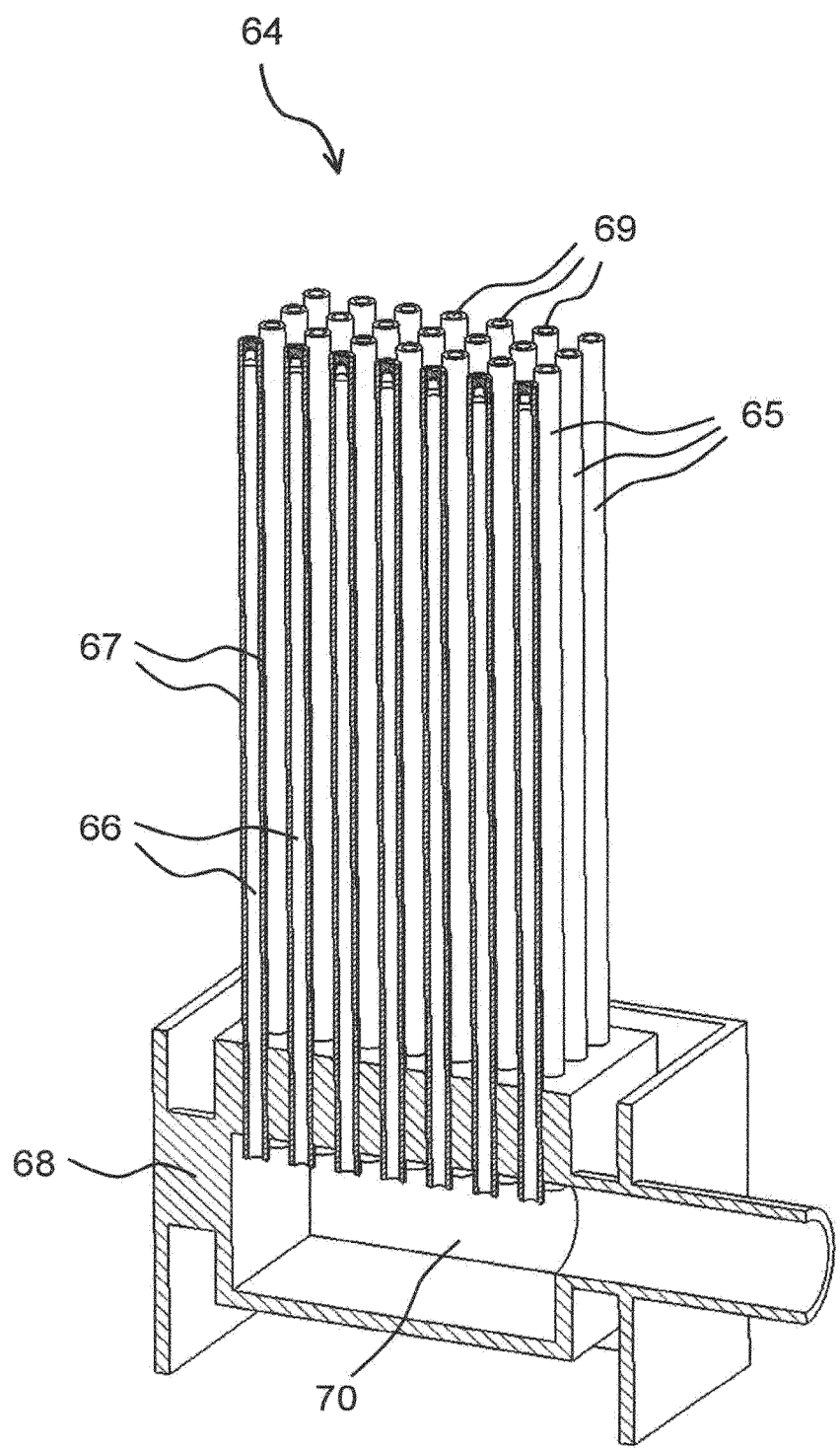
FIGS. 5 and 6 show sectional views of a first and a second membrane filter with hollow fiber membranes according to the invention.

FIG. 5 shows a sectional view of a first membrane filter 64 configured to filter a liquid through hollow fiber membranes 65 according to the invention which respectively include a lumen 66 and a wall 67 that envelops the lumen 66, wherein the hollow fiber membranes 65 are arranged at a bottom in a base element 68 and respectively include an individually closed end 69 on top that floats in the liquid freely, wherein the base element 68 includes a permeate collection cavity 70, wherein the lumen 66 of the hollow fiber membranes 65 are connected to the permeate collection cavity 70 in order to collect a filtrate from the lumen 66, wherein the ends 69 of the hollow fiber membranes are closed according to one of the methods according to the invention.

Figure 6:
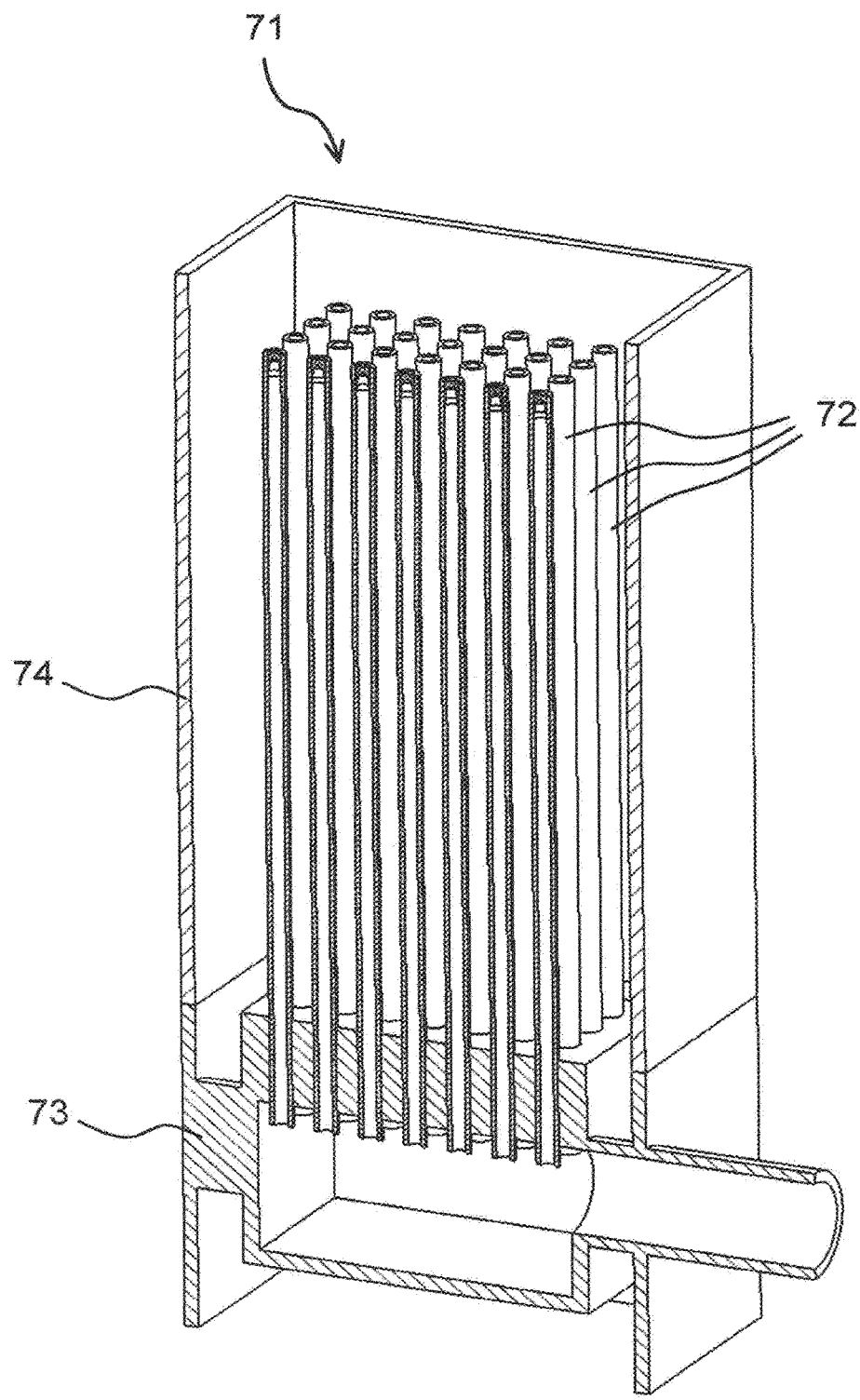

FIG. 6 shows a sectional view of a second membrane filter 71 for filtering a liquid and including the hollow fiber membrane 72 according to the invention that are attached at a bottom in a base element 73 and individually closed on top and that float in the liquid freely. The membrane filter 71 is substantially identical to the first membrane filter 64. Additionally the hollow fiber membrane 72 of the base element 73 are enveloped by a tube 74. Thus, air introduced into the membrane filter 71 for flushing the hollow fiber membranes 72 is better retained in the bundle of the hollow fiber membrane 72 and thus better utilized for flushing.

REFERENCE NUMERALS AND DESIGNATIONS 1 hollow fiber membrane
2 portion
3 resin
4 longitudinal axis
5 lumen
6 wall
7 textile layer
8 outer diameter
9 lumen diameter
10 face
11 end portion
12 curvature
13 outer free surface
14 membrane surface
15 UV light
16 resin plug
17 gripper
18 funnel
19 tube section
20 inner diameter
21 free end
22 UV curing unit
23 textile layer
24 hollow fiber membrane
25 end portion
26 gripper
27 longitudinal axis
28 injection needle
29 lumen
30 outer needle diameter
31 lumen diameter
32 portion
33 resin
34 face
35 wall
36 membrane surface
37 UV light
38 outer free surface
39 inner free surface
40 hollow fiber membrane
41 lumen
42 wall
43 textile layer
44 end portion
45 portion
46 resin
47 plug
48 face
49 outer free surface
50 inner free surface
51 membrane surface
52 hollow fiber membrane
53 lumen
54 wall
55 textile layer
56 end portion
57 portion
58 resin
59 resin plug
60 face
61 outer free surface
62 inner free surface
63 distance
64 membrane filter
65 hollow fiber membrane
66 lumen
67 wall
68 base element
69 end
70 permeate collection cavity
71 membrane filter
72 hollow fiber membrane
73 base element
74 tube

What is claimed is:

1. A method for closing an end section of a hollow fiber membrane, the hollow fiber membrane including a lumen and wall radially enveloping the lumen, the wall including an inner textile layer, the method comprising:

feeding a low viscosity resin by positive pressure through an end face of the hollow fiber membrane into the end section of the hollow fiber membrane and closing the end face with an outer free surface of the resin; and curing the resin after a time period at the most of 5 seconds by UV light,
wherein the resin is arranged exclusively within the hollow fiber membrane afer the curing.

2. In the method according to claim 1, wherein the outer free surface of the resin in the lumen is concave.

3. In the method according to claim 1,
performing the feeding of the low viscosity resin within 0.5-2.5 seconds and letting a dwelling time of at least 1 second pass between an end of the feeding and a beginning of the UV light radiation; and
letting the resin from the lumen into the wall to a membrane surface of the end portion and thus saturate the wall during the dwelling time the lumen remains closed by the resin.

4. In the method according to claim 1, wherein a longitudinal axis of the hollow fiber membrane is in a horizontal position during the closing.

5. The method according to claim 1, further comprising;
retaining the hollow fiber membrane by a gripper in front of the end section during the closing while performing the following steps automated in sequence:
sliding a funnel that leads into a tubular section over the end section until the tubular section closely envelops an outer membrane surface;
feeding the resin from a free end of the tubular section through the tubular section into the end section of the hollow fiber membrane;
sliding the funnel off the end section again; and
positioning a UV-curing unit over the end section, the UV curing unit irradiating the end section with the UV-light and thereby curing the resin.

6. The method according to claim 1, further comprising:
fixing another end section of the hollow fiber membrane in a base element so that the other end section of the hollow fiber membrane is oriented away from the base element,
wherein the base element includes a permeate collection cavity to which the lumen of the hollow fiber membrane is connected and that is configured to collect a filtrate from the lumen.

7. The method according to claim 6, further comprising:
enveloping the hollow fiber membrane of the base element with a tube.

* * * * *